United States Patent
Zheng et al.

(10) Patent No.: US 10,951,551 B2
(45) Date of Patent: Mar. 16, 2021

(54) QUEUE MANAGEMENT METHOD AND APPARATUS

(71) Applicant: HUAWEI TECHNOLOGIES CO., LTD., Guangdong (CN)

(72) Inventors: Shengwei Zheng, Shenzhen (CN); Dehong Ding, Beijing (CN); Xiong Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 16/233,894

(22) Filed: Dec. 27, 2018

(65) Prior Publication Data

US 2019/0132262 A1 May 2, 2019

Related U.S. Application Data

(63) Continuation of application No. PCT/CN2017/073163, filed on Feb. 9, 2017.

(30) Foreign Application Priority Data

Jun. 28, 2016 (CN) .......................... 201610489863.9

(51) Int. Cl.
*H04L 12/879* (2013.01)
*H04L 12/863* (2013.01)
(Continued)

(52) U.S. Cl.
CPC ........ *H04L 49/9026* (2013.01); *H04L 47/527* (2013.01); *H04L 47/62* (2013.01);
(Continued)

(58) Field of Classification Search
CPC ............. H04L 49/9026; H04L 49/9015; H04L 47/527; H04L 47/623; H04L 49/9078
(Continued)

(56) References Cited

U.S. PATENT DOCUMENTS 6,556,578 B1 * 4/2003 Silberschatz ........... H04L 47/10
370/234
9,755,932 B1 * 9/2017 Godbole ............. H04L 43/0876
(Continued)

FOREIGN PATENT DOCUMENTS

| CN | 101403983 A | 4/2009 |
|---|---|---|
| CN | 101630997 A | 1/2010 |

(Continued)

OTHER PUBLICATIONS

CN-102377682-A (Year: 2012).*
(Continued)

*Primary Examiner* — Jae Y Lee
*Assistant Examiner* — Jean F Voltaire
(74) *Attorney, Agent, or Firm* — Conley Rose, P.C.

(57) ABSTRACT

A queue management method and apparatus are disclosed. The queue management method includes: storing a first packet to a first buffer cell included in a first macrocell, where the first macrocell is enqueued to a first entity queue, the first macrocell includes N consecutive buffer cells, and the first buffer cell belongs to the N buffer cells; correcting, based on a packet length of the first packet, an average packet length in the first macrocell that is obtained before the first packet is stored, to obtain a current average packet length in the first macrocell; and generating, based on the first macrocell and the first entity queue, queue information corresponding to the first macrocell of the first macrocell in the first entity queue, a head pointer in the first macrocell, a tail pointer in the first macrocell, and the current average packet length in the first macrocell.

20 Claims, 4 Drawing Sheets

(51) Int. Cl.
    *H04L 12/873*     (2013.01)
    *H04L 12/883*     (2013.01)
    *H04L 12/935*     (2013.01)
    *H04L 12/861*     (2013.01)

(52) U.S. Cl.
    CPC .......... *H04L 47/623* (2013.01); *H04L 49/901* (2013.01); *H04L 49/9015* (2013.01); *H04L 49/3045* (2013.01); *H04L 49/9078* (2013.01)

(58) Field of Classification Search
    USPC ........................................................ 370/412
    See application file for complete search history.

(56) References Cited

U.S. PATENT DOCUMENTS

| | | | | |
|---|---|---|---|---|
| 2002/0163914 | A1* | 11/2002 | Dooley | H04L 49/3081 370/394 |
| 2003/0154328 | A1* | 8/2003 | Henderson | H04L 69/16 710/1 |
| 2006/0050690 | A1* | 3/2006 | Epps | H04L 47/527 370/359 |
| 2010/0141497 | A1 | 6/2010 | Yang et al. | |
| 2015/0186583 | A1 | 7/2015 | Jayakumar et al. | |
| 2016/0380895 | A1 | 12/2016 | Xiong et al. | |
| 2017/0048145 | A1* | 2/2017 | Shiraki | H04L 41/0803 |

FOREIGN PATENT DOCUMENTS

| | | | |
|---|---|---|---|
| CN | 101753144 | A | 6/2010 |
| CN | 102377682 | A * | 3/2012 |
| CN | 102377682 | A | 3/2012 |
| CN | 102437929 | A | 5/2012 |
| CN | 103532772 | A | 1/2014 |
| CN | 104750906 | A | 7/2015 |
| CN | 105391567 | A | 3/2016 |
| CN | 106209681 | A | 12/2016 |
| WO | 2008025194 | A1 | 3/2008 |
| WO | 2012139496 | A1 | 10/2012 |
| WO | 2015139259 | A1 | 9/2015 |
| WO | 2016019554 | A1 | 2/2016 |

OTHER PUBLICATIONS

Iyer, Sundar et al. "Analysis of a Memory Architecture for Fast Packet Buffers" High Performance Switching and Routing, 2001 IEEE Workshop on May 23-31, 2001, May 29, 2001, XP055574050, 10 pages.

I., Papaefstathiou et al. "Queue Management in Network Processors", Design, Automation, and Test in Europe Conference and Exhibition. Proceedings, IEEE Computer Society, US, Mar. 7, 2005, XP058274395, 6 pages.

Extended European Search Report dated Apr. 8, 2019 in corresponding European Patent Application No. 17818821.5 (10 pages).

International Search Report dated May 4, 2017 in corresponding International Application No. PCT/CN2017/073163.

Office Action, dated Oct. 31, 2018, in Chinese Application No. 201610489863.9 (6 pp.).

International Search Report, dated May 4, 2017, in International Application No. PCT/CN2017/073163 (4 pp.).

Written Opinion of the International Searching Authority, dated May 4, 2017, in International Application No. PCT/CN2017/073163 (8 pp.).

* cited by examiner

QUEUE MANAGEMENT METHOD AND APPARATUS

CROSS-REFERENCE TO RELATED APPLICATIONS

This application is a continuation of International Application No. PCT/CN2017/073163, filed on Feb. 9, 2017, which claims priority to Chinese Patent Application No. 201610489863.9, filed on Jun. 28, 2016, the disclosures of the aforementioned applications are hereby incorporated by reference in their entireties.

TECHNICAL FIELD

The present disclosure relates to the field of computer technologies, and in particular, to a queue management method and apparatus.

BACKGROUND

With development of network technologies, people have an increasingly high network bandwidth requirement, which covers bandwidths, quality of service (QoS for short) and costs of related devices. A network chip is required to buffer and process more packets and have a precise scheduling capability and lower chip costs. These are all embodied in a competitive strength of a product.

Main functions of a traffic management (TM for short) chip in the network chip are packet buffering, enqueuing, scheduling, and dequeuing. The packet buffering, enqueuing, and dequeuing are mainly operations performed on a linked list of a queue that are implemented by a queue management module. The packet scheduling is implemented by a scheduling module. If a granularity of length information of each packet is increased in consideration of costs, scheduling accuracy is affected, causing a very large burst and jitter.

In the prior art, a common queue management procedure may include the following steps.
1. Receive a packet from an ingress of a network chip.
2. Buffer the received packet to a random memory outside the network chip.
3. After buffering the packet, generate a packet descriptor (English full name: Packet Descriptor, PD for short), and then enqueue the PD to a corresponding entity queue, where the enqueuing is implemented by a queue management module, the PD is information for describing the packet, and the PD includes a pointer of a next packet to which a packet in the entity queue points, and the like.

The current queue management solution has at least the following problems: Because a high-bandwidth device needs to buffer more packets, packet data is usually buffered in a random memory outside a chip, and queue information (including a head pointer of a linked list, a pointer of a next packet, and a tail pointer of the linked list) of the packet and a length of each packet are usually placed inside the chip, the head pointer and the tail pointer of a queue are maintained based on the entity queue, and the pointer of the next packet and the packet length are maintained based on each packet. The information is used to maintain the linked list of the entity queue and ensure QoS of scheduling. The pointer of the next packet occupies a very large buffered resource in the chip, causing an increase of chip costs. However, the pointer of the next packet is indispensable for implementing normal chip functions and performance. For a chip having a capability of processing 100 gigabit (Gbit for short) bytes, a quantity of short packets that need to be buffered usually reaches a magnitude of hundreds of kilobits (Kbit for short) packets, and even a magnitude of 1-megabit (Mbit for short) packets. An example in which M packets are buffered is used as an example. Each packet needs to be represented by using a 20-bit (English name: bit) pointer. In this way, 20 Mbit are required for storing related resources of a pointer of a next packet in the chip. 20 Mbit occupies a very large quantity of storage resources in the chip, causing increases of chip costs and power consumption.

SUMMARY

Embodiments of the present invention provide a queue management method and apparatus, to reduce storage resources in a network chip that are occupied by an entity queue, thereby reducing costs and power consumption of the chip.

To resolve the foregoing technical problems, the embodiments of the present invention provide the following technical solutions:

According to a first aspect, an embodiment of the present invention provides a queue management method, including:
storing a first packet to a first buffer cell included in a first macrocell, where the first macrocell is enqueued to a first entity queue, the first macrocell includes N consecutive buffer cells, N is a natural number greater than or equal to 2, and the first buffer cell belongs to the N buffer cells;
correcting, based on a packet length of the first packet, an average packet length in the first macrocell that is obtained before the first packet is stored, to obtain a current average packet length in the first macrocell; and
generating, based on the first macrocell and the first entity queue, queue information corresponding to the first macrocell, where the queue information corresponding to the first macrocell includes a macrocell identifier of the first macrocell in the first entity queue, a head pointer in the first macrocell, a tail pointer in the first macrocell, and the current average packet length in the first macrocell.

In this embodiment of the present invention, a plurality of consecutive buffer cells may be packaged into a macrocell, and the macrocell may be enqueued to an entity queue. For example, the first macrocell is enqueued to the first entity queue. Entity queue management is using a resource of a buffer cell by using a macrocell as a granularity without needing to store a pointer of a next packet to which each packet points. In this embodiment of the present invention, for a macrocell, only an average packet length in the macrocell needs to be maintained, and a packet length of each packet does not need to be stored. Therefore, in this embodiment of the present invention, when scales of packets that are buffered outside a network chip are the same, storage resources in the network chip that are occupied by the entity queue in the network chip are reduced, thereby reducing costs and power consumption of the network chip.

With reference to the first aspect, in a first possible implementation of the first aspect, the first entity queue includes at least the first macrocell and a second macrocell that is in the first entity queue and that is located before and neighboring to the first macrocell, and the method further includes:
determining, in the first entity queue, that a macrocell from which a packet needs to be dequeued is the second macrocell, where queue information corresponding to the second macrocell includes a macrocell identifier of the second macrocell in the first entity queue, a head pointer in the second macrocell, a tail pointer in the second macrocell, and a current average packet length in the second macrocell; and reading, based on the head pointer in the second macrocell, a second packet that needs to be dequeued, and changing an offset value corresponding to the head pointer in the second macrocell.

In this embodiment of the present invention, the second macrocell is enqueued to the first entity queue. Entity queue management is using a resource of a buffer cell by using a macrocell as a granularity without needing to store a pointer of a next packet to which each packet points. When the second macrocell needs to be dequeued, the second packet that needs to be dequeued may be read based on the head pointer in the second macrocell, and the offset value corresponding to the head pointer in the second macrocell is changed. Therefore, in this embodiment of the present invention, dequeuing of the packet may be implemented without needing to store a packet length of each packet, so that the storage resources in the network chip that are occupied by the entity queue in the network chip are reduced, thereby reducing the costs and the power consumption of the network chip.

With reference to the first possible implementation of the first aspect, in a second possible implementation of the first aspect, after the reading, based on the head pointer in the second macrocell, a second packet that needs to be dequeued, the method further includes:

sending the current average packet length in the second macrocell to a scheduler and a rate limiter, so that the scheduler updates a weight of the scheduler based on the current average packet length in the second macrocell, and the rate limiter updates a token of the rate limiter based on the current average packet length in the second macrocell.

In this embodiment of the present invention, an actual length of each packet in the second macrocell does not need to be stored, and only the average packet length needs to be maintained. The scheduler and the rate limiter may be updated by using a macrocell as a granularity. A scheduling effect is not affected.

With reference to the first aspect or the first or the second possible implementation of the first aspect, in a third possible implementation of the first aspect, after the generating, based on the first macrocell and the first entity queue, queue information corresponding to the first macrocell, the method further includes:

maintaining a linked list of the first entity queue based on the queue information corresponding to the first macrocell.

In this embodiment of the present invention, management on the first entity queue may be implemented by using the linked list, and a queue tail pointer in the linked list may point to the first macrocell that is enqueued to the first entity queue a moment ago, thereby implementing management on the entity queue.

With reference to the first aspect or the first or the second possible implementation of the first aspect, in a fourth possible implementation of the first aspect, the storing a first packet to a first buffer cell included in a first macrocell includes:

allocating the tail pointer in the first macrocell to the first packet, and changing an offset value corresponding to the tail pointer in the first macrocell.

In this embodiment of the present invention, the offset value corresponding to the tail pointer in the first macrocell is changed when the first packet is written to the first macrocell, so that a newly-added packet may be pointed to by using the tail pointer in the macrocell.

With reference to the first aspect or the first or the second possible implementation of the first aspect, in a fifth possible implementation of the first aspect, the correcting, based on a packet length of the first packet, an average packet length in the first macrocell that is obtained before the first packet is stored, to obtain a current average packet length in the first macrocell includes:

obtaining a quantity of all packets that are already stored in the first macrocell before the first packet is stored; and calculating the current average packet length in the first macrocell based on the quantity of all packets that are already stored, the average packet length in the first macrocell before the first packet is stored, and the packet length of the first packet.

In this embodiment of the present invention, the current average packet length in the first macrocell may be changed when a new packet is written to the first macrocell, and an actual length of each packet does not need to be record, so that the storage resources in the network chip that are occupied by the entity queue in the network chip are reduced, thereby reducing the costs and the power consumption of the network chip.

According to a second aspect, an embodiment of the present invention further provides a queue management apparatus, including:

a storage module, configured to store a first packet to a first buffer cell included in a first macrocell, where the first macrocell is enqueued to a first entity queue, the first macrocell includes N consecutive buffer cells, N is a natural number greater than or equal to 2, and the first buffer cell belongs to the N buffer cells;

an average packet length correction module, configured to correct, based on a packet length of the first packet, an average packet length in the first macrocell that is obtained before the first packet is stored, to obtain a current average packet length in the first macrocell; and a queue information generation module, configured to generate, based on the first macrocell and the first entity queue, queue information corresponding to the first macrocell, where the queue information corresponding to the first macrocell includes a macrocell identifier of the first macrocell in the first entity queue, a head pointer in the first macrocell, a tail pointer in the first macrocell, and the current average packet length in the first macrocell.

In this embodiment of the present invention, a plurality of consecutive buffer cells may be packaged into a macrocell, and the macrocell may be enqueued to an entity queue. For example, the first macrocell is enqueued to the first entity queue. Entity queue management is using a resource of a buffer cell by using a macrocell as a granularity without needing to store a pointer of a next packet to which each packet points. In this embodiment of the present invention, for a macrocell, only an average packet length in the macrocell needs to be maintained, and a packet length of each packet does not need to be stored. Therefore, in this embodiment of the present invention, when scales of packets that are buffered outside a network chip are the same, storage resources in the network chip that are occupied by the entity queue in the network chip are reduced, thereby reducing costs and power consumption of the network chip.

With reference to the second aspect, in a first possible implementation of the second aspect, the first entity queue includes at least the first macrocell and a second macrocell that is in the first entity queue and that is located before and neighboring to the first macrocell, and the queue management apparatus further includes:

a dequeuing management module, configured to determine, in the first entity queue, that a macrocell from which a packet needs to be dequeued is the second macrocell, where queue information corresponding to the second macrocell includes a macrocell identifier of the second macrocell in the first entity queue, a head pointer in the second macrocell, a tail pointer in the second macrocell, and a current average packet length in the second macrocell; and a packet reading module, configured to: read, based on the head pointer in the second macrocell, a second packet that needs to be dequeued, and change an offset value corresponding to the head pointer in the second macrocell.

In this embodiment of the present invention, the second macrocell is enqueued to the first entity queue. Entity queue management is using a resource of a buffer cell by using a macrocell as a granularity without needing to store a pointer of a next packet to which each packet points. When the second macrocell needs to be dequeued, the second packet that needs to be dequeued may be read based on the head pointer in the second macrocell, and the offset value corresponding to the head pointer in the second macrocell is changed. Therefore, in this embodiment of the present invention, dequeuing of the packet may be implemented without needing to store a packet length of each packet, so that the storage resources in the network chip that are occupied by the entity queue in the network chip are reduced, thereby reducing the costs and the power consumption of the network chip.

With reference to the first possible implementation of the second aspect, in a second possible implementation of the second aspect, the queue management apparatus further includes a sending module, and the sending module is configured to: after the packet reading module reads, based on the head pointer in the second macrocell, the second packet that needs to be dequeued, send the current average packet length in the second macrocell to a scheduler and a rate limiter, so that the scheduler updates a weight of the scheduler based on the current average packet length in the second macrocell, and the rate limiter updates a token of the rate limiter based on the current average packet length in the second macrocell.

In this embodiment of the present invention, an actual length of each packet in the second macrocell does not need to be stored, and only the average packet length needs to be maintained. The scheduler and the rate limiter may be updated by using a macrocell as a granularity. A scheduling effect is not affected.

With reference to the second aspect or the first or the second possible implementation of the second aspect, in a third possible implementation of the second aspect, the queue management apparatus further includes a linked list maintenance module, and the linked list maintenance module is configured to: after the queue information generation module generates, based on the first macrocell and the first entity queue, the queue information corresponding to the first macrocell, maintain a linked list of the first entity queue based on the queue information corresponding to the first macrocell.

In this embodiment of the present invention, management on the first entity queue may be implemented by using the linked list, and a queue tail pointer in the linked list may point to the first macrocell that is enqueued to the first entity queue a moment ago, thereby implementing management on the entity queue.

With reference to the second aspect or the first or the second possible implementation of the second aspect, in a fourth possible implementation of the second aspect, the storage module is specifically configured to: allocate the tail pointer in the first macrocell to the first packet, and change an offset value corresponding to the tail pointer in the first macrocell.

In this embodiment of the present invention, the offset value corresponding to the tail pointer in the first macrocell is changed when the first packet is written to the first macrocell, so that a newly-added packet may be pointed to by using the tail pointer in the macrocell.

With reference to the second aspect or the first or the second possible implementation of the second aspect, in a fifth possible implementation of the second aspect, the average packet length correction module includes:

a packet quantity obtaining module, configured to obtain a quantity of all packets that are already stored in the first macrocell before the first packet is stored; and an average packet length calculation module, configured to calculate and correct the current average packet length in the first macrocell based on the quantity of all packets that are already stored, the average packet length in the first macrocell before the first packet is stored, and the packet length of the first packet.

In this embodiment of the present invention, the current average packet length in the first macrocell may be changed when a new packet is written to the first macrocell, and an actual length of each packet does not need to be record, so that the storage resources in the network chip that are occupied by the entity queue in the network chip are reduced, thereby reducing the costs and the power consumption of the network chip.

It can be learned from the foregoing technical solutions that the embodiments of the present invention have the following advantages:

In the embodiments of the present invention, first, the first packet is stored to the first buffer cell in the first macrocell, the first macrocell is enqueued to the first entity queue, and the first macrocell includes the N consecutive buffer cells. Then, the average packet length in the first macrocell before the first packet is stored is corrected based on the packet length of the first packet, to obtain the current average packet length in the first macrocell. Finally, the queue information corresponding to the first macrocell is generated based on the first macrocell and the first entity queue. The queue information corresponding to the first macrocell includes the macrocell identifier of the first macrocell in the first entity queue, the head pointer in the first macrocell, the tail pointer in the first macrocell, and the current average packet length in the first macrocell. In this embodiment of the present invention, a plurality of consecutive buffer cells may be packaged into a macrocell, and the macrocell may be enqueued to an entity queue. For example, the first macrocell is enqueued to the first entity queue. Entity queue management is using a resource of a buffer cell by using a macrocell as a granularity without needing to store a pointer of a next packet to which each packet points. In the embodiments of the present invention, for a macrocell, only an average packet length in the macrocell needs to be maintained, and a packet length of each packet does not need to be stored. Therefore, in the embodiments of the present invention, when scales of packets that are buffered outside the network chip are the same, the storage resources in the network chip that are occupied by the entity queue in the network chip are reduced, thereby reducing the costs and the power consumption of the network chip.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons skilled in the art may derive other drawings from these accompanying drawings.

FIG. 3-a is a schematic structural composition diagram of a queue management apparatus according to an embodiment of the present invention;

FIG. 3-b is a schematic structural composition diagram of another queue management apparatus according to an embodiment of the present invention;

FIG. 3-c is a schematic structural composition diagram of another queue management apparatus according to an embodiment of the present invention;

FIG. 3-d is a schematic structural composition diagram of another queue management apparatus according to an embodiment of the present invention;

FIG. 3-e is a schematic structural composition diagram of an average packet length correction module according to an embodiment of the present invention.

DESCRIPTION OF EMBODIMENTS

Embodiments of the present invention provide a queue management method and apparatus, to reduce storage resources in a network chip that are occupied by an entity queue, thereby reducing costs and power consumption of the chip.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described below are merely some rather than all of the embodiments of the present invention. All other embodiments obtained by persons skilled in the art based on the embodiments of the present invention shall fall within the protection scope of the present invention.

In the specification, claims, and accompanying drawings of the present invention, the terms "first", "second", and so on are intended to distinguish between similar objects rather than describe a specific order or sequence. It should be understood that the terms used in such a way are interchangeable in proper circumstances. This is merely a distinguishing manner that is used when objects having a same attribute are described in the embodiments of the present invention. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

Detailed descriptions are separately provided below.

Figure 1:
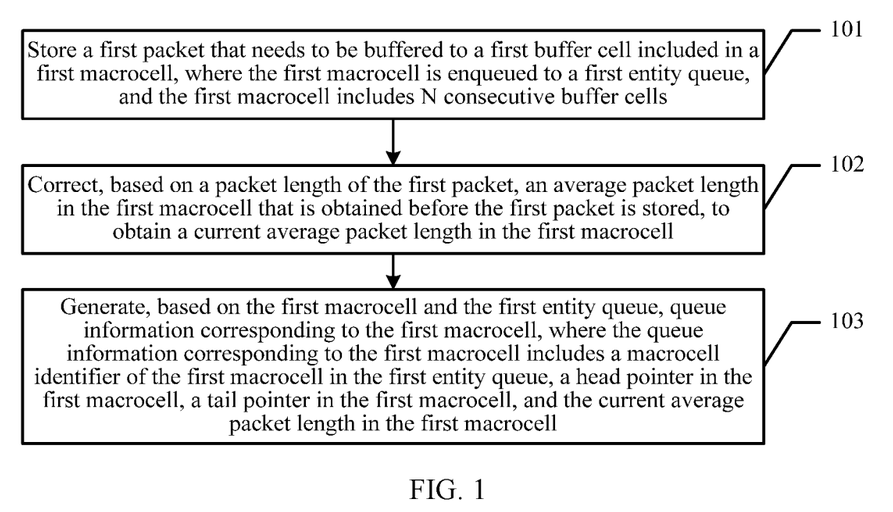
FIG. 1 is a schematic block flowchart of a queue management method according to an embodiment of the present invention.

An embodiment of the queue management method in the present invention may be applied to traffic management for an entity queue. Referring to FIG. 1, the queue management method provided in this embodiment of the present invention may include the following steps.

101. Store a first packet to a first buffer cell included in a first macrocell, where the first macrocell is enqueued to a first entity queue, and the first macrocell includes N consecutive buffer cells.

N is a natural number greater than or equal to 2, and the first buffer cell belongs to the N buffer cells.

In this embodiment of the present invention, a packet that needs to be buffered may be received from an interface of a network chip. For ease of description, in subsequent embodiments, the packet that needs to be buffered may be defined as the first packet. The first packet needs to be buffered to a random memory outside the network chip, for example, a double data rate synchronous dynamic random access memory (English full name: Double Data Rate Synchronous Dynamic Random Access Memory, DDR SDRAM for short). In this embodiment of the present invention, the random memory outside the network chip is divided into a plurality of macrocells. Each macrocell includes a plurality of consecutive buffer cells, to be specific, the plurality of consecutive buffer cells in the random memory may be packaged into a macrocell. Each buffer cell is a storage cell (English name: Cell) in the random memory. Each buffer cell has an identifier, that is, a pointer of the cell, and the pointer of the cell corresponds to a physical address of the random memory. Specifically, a macrocell includes N consecutive buffer cells, and a value of N is a natural number greater than or equal to 2. Addresses of the N buffer cells are consecutive in storage space. For example, eight buffer cells whose addresses are consecutive may be packaged into a macrocell. For another example, four buffer cells whose addresses are consecutive may be packaged into a macrocell, or 16 buffer cells whose addresses are consecutive may be packaged into a macrocell.

In this embodiment of the present invention, the random memory outside the network chip may be divided into a plurality of macrocells, and an entire packet may be stored to a buffer cell. For ease of description, a macrocell that stores the first packet to the random memory is defined as the first macrocell. Specifically, the first macrocell includes a plurality of consecutive buffer cells, a buffer cell that stores the first packet is defined as the first buffer cell, the first packet may be specifically stored to the first buffer cell in the first macrocell, and the first buffer cell that stores the first packet is one of the N consecutive buffer cells included in the first macrocell. For example, the first packet may be stored to a storage address to which a tail pointer in the first macrocell points.

Specifically, in this embodiment of the present invention, step 101 of storing a first packet to a first buffer cell included in a first macrocell includes:

A1. Allocate a tail pointer in the first macrocell to the first packet, and change an offset value corresponding to the tail pointer in the first macrocell.

The first macrocell includes the N consecutive buffer cells, and the buffer cell is configured to store a packet. When the first packet needs to be stored to the first macrocell, the first macrocell is searched for an idle buffer cell, and the first buffer cell to which the tail pointer in the first macrocell points is idle, so that the first packet may be stored to address space to which the tail pointer in the first macrocell points. After the first packet is stored, the offset value corresponding to the tail pointer in the first macrocell may further be changed to a next idle buffer cell. For example, the offset value of the tail pointer in the first macrocell is increased by 1. This is merely an example. A specific offset degree may depend on a requirement of an application scenario. This example is not intended to limit the present invention.

102. Correct, based on a packet length of the first packet, an average packet length (English name: Average Packet Length) in the first macrocell that is obtained before the first packet is stored, to obtain a current average packet length in the first macrocell.

In this embodiment of the present invention, for each macrocell, an average packet length in the macrocell may be obtained. The average packet length in the macrocell is an average value of lengths of all packets stored in the macrocell, and a unit may be a byte (English name: Byte). Each time a new packet is stored in the macrocell, an original average packet length may be corrected, to be specific, the original average packet length may be corrected based on a length of the newly-stored packet. For example, the average packet length is calculated before the first packet is stored to the first macrocell. When the first packet is written to the first macrocell, the average packet length in the first macrocell may be corrected based on the packet length of the first packet, to obtain the current average packet length in the first macrocell. In this embodiment of the present invention, the first macrocell is enqueued to the first entity queue. After the first packet is written to the first macrocell in the first entity queue, the original average packet length in the first macrocell may be corrected based on the packet length of the newly-written first packet. The first entity queue does not need to store a packet length of each packet, but stores only an average packet length for each macrocell by using the macrocell as a granularity, thereby saving many overheads caused by storing the packet length of each packet. When the macrocell stores more packets, more overheads can be saved.

In some embodiments of the present invention, step 102 of correcting, based on a packet length of the first packet, an average packet length in the first macrocell that is obtained before the first packet is stored, to obtain a current average packet length in the first macrocell may specifically include the following steps:

B1. Obtain a quantity of all packets that are already stored in the first macrocell before the first packet is stored.

B2. Calculate the current average packet length in the first macrocell based on the quantity of all packets that are already stored, the average packet length in the first macrocell before the first packet is stored, and the packet length of the first packet.

First, step B1 of obtaining a quantity of all packets that are already stored in the first macrocell before the first packet is stored, that is, the quantity of packets that are already stored in the first macrocell before the first packet is stored, is performed. For example, the quantity of packets that are already stored in the first macrocell may be determined by using a difference between a head pointer in the first macrocell and the tail pointer in the first macrocell. Then, step B2 of calculating the current average packet length in the first macrocell based on the quantity of all packets that are already stored, the average packet length in the first macrocell before the first packet is stored, and the packet length of the first packet is performed. For example, the calculation may be performed by using the following formula: Average packet length new=(average packet length old*quantity of packets old+enqueued packet length)/(quantity of packets old+1). The average packet length old is the average packet length before the first packet is stored, the enqueued packet length is the packet length of the first packet, and the quantity of packets old is the quantity of all packets that are already stored in the first macrocell.

103. Generate, based on the first macrocell and the first entity queue, queue information corresponding to the first macrocell, where the queue information corresponding to the first macrocell includes a macrocell identifier of the first macrocell in the first entity queue, a head pointer in the first macrocell, the tail pointer in the first macrocell, and the current average packet length in the first macrocell.

In this embodiment of the present invention, after the current average packet length in the first macrocell is obtained, the queue information corresponding to the first macrocell may be generated based on the first macrocell and the first entity queue. The queue information corresponding to the first macrocell is queue management information of the first macrocell enqueued to the first entity queue. For each macrocell in the first entity queue, queue management information corresponding to the macrocell may be generated. The queue information corresponding to each macrocell in the entity queue includes a macrocell identifier of the macrocell in the entity queue, a head pointer in the macrocell, a tail pointer in the macrocell, and a current average packet length in the macrocell. It should be noted that in this embodiment of the present invention, for each macrocell, an average packet length in the macrocell needs to be changed when a packet is enqueued, to maintain the current average packet length in the macrocell as an average packet length after a new packet is stored.

In this embodiment of the present invention, after the first packet is stored to the first buffer cell in the first macrocell, a storage status of the first packet in the first macrocell may be determined by using step 101, then the head pointer in the first macrocell and the tail pointer in the first macrocell are determined, and the macrocell identifier of the first macrocell in the first entity queue may be generated based on a specific address of the first macrocell enqueued to the first entity queue. The first packet is stored to the first macrocell. Therefore, the queue information corresponding to the first macrocell may be generated. Each macrocell is linked to a next macrocell. Compared with the next macrocell, an address of the preceding macrocell is a pointer that points to the next macrocell (which is also referred to as a next pointer). The next pointer may be determined by using the macrocell identifier of the first macrocell in the first entity queue. Macrocell identifiers of the macrocells in first entity queue are used to determine an enqueuing sequence of the macrocells in the first entity queue.

It should be noted that in this embodiment of the present invention, an entity queue does not need to store a pointer of a next packet that corresponds to each packet, but stores a macrocell identifier of a macrocell including N consecutive buffer cells in the entity queue. If a total quantity of packets that need to be buffered is M and M is a non-zero natural number, in the prior art, the entity queue needs to store the pointer for the next packet of each packet, to be specific, stores M pointers of next packets in total. However, in this embodiment of the present invention, a macrocell includes N consecutive buffer cells and each buffer cell stores a packet, so that the macrocell may accommodate N packets. Therefore, when a total quantity of packets is M, M/N macrocells need to be buffered. Therefore, a total of M/N macrocell identifiers are stored. It can be learned that, compared with the prior art, in this embodiment of the present invention, fewer queue management resources are occupied in a chip and are only 1/N of a quantity of occupied resources in the prior art. With an increase of a value of N, fewer queue management resources are occupied in the chip in this embodiment of the present invention. In addition, the entity queue may further include a head pointer in the macrocell and a tail pointer in the macrocell. The head pointer in the macrocell is one end that allows dequeuing of a packet, and the head pointer points to a packet at the head in the macrocell. The tail pointer in the macrocell is one end that allows receiving of a packet, and the tail pointer points to a packet at the tail in the macrocell.

In this embodiment of the present invention, a macrocell in the random memory outside the network chip can be allocated only to one entity queue, to be specific, all packets included in the macrocell are enqueued to a same entity queue. For example, the first macrocell corresponds to the first entity queue, so that packets stored in all the buffer cells in the first macrocell are enqueued to the first entity queue. It should be noted that in this embodiment of the present invention, because a high-bandwidth device needs to buffer more packets, packet data is buffered in the random memory outside the network chip. However, the queue information corresponding to the first macrocell is stored in the network chip. In the network chip, the queue information corresponding to the macrocell is managed by using the entity queue.

In some embodiments of the present invention, the first entity queue includes at least the first macrocell and a second macrocell that is in the first entity queue and that is located before and neighboring to the first macrocell. In addition to the foregoing steps, the queue management method provided in this embodiment of the present invention may further include the following steps.

C1. Determine, in the first entity queue, that a macrocell from which a packet needs to be dequeued is the second macrocell, where queue information corresponding to the second macrocell includes a macrocell identifier of the second macrocell in the first entity queue, a head pointer in the second macrocell, a tail pointer in the second macrocell, and a current average packet length in the second macrocell.

C2. Read, based on the head pointer in the second macrocell, a second packet that needs to be dequeued, and change an offset value corresponding to the head pointer in the second macrocell.

Buffering and enqueuing of the first packet in this embodiment of the present invention are described in step 101 to step 103, and then scheduling and dequeuing of the second packet in this embodiment of the present invention are described in step C1 and step C2. A packet that needs to be dequeued may be determined by using a configured scheduling manner. For example, an entity queue in which the packet that needs to be scheduled is located may be determined by scheduling the packet based on output information such as an output port, a user group, a user, and a priority. In this embodiment of the present invention, an example in which the packet that needs to be dequeued is located in the first entity queue is used. First, the first entity queue is selected from a plurality of entity queues. For example, the first entity queue includes two macrocells, which are respectively the first macrocell and the second macrocell, the second macrocell is a queue head of the first entity queue, and the first macrocell is a queue tail of the first entity queue, step C1 of determining, in the first entity queue, that a macrocell from which a packet needs to be dequeued is the second macrocell is performed first.

Further, in some embodiments of the present invention, step C1 of determining, in the first entity queue, that a macrocell from which a packet needs to be dequeued is the second macrocell may specifically include the following step:

C11. Determine, based on a queue head pointer in a linked list of the first entity queue, that a macrocell to which the queue head pointer points is the second macrocell.

In this embodiment of the present invention, the entity queue may be managed by using the linked list. The linked list is a most common queue implementation, and a data structure of the linked list includes the queue head pointer and a queue tail pointer. The second macrocell is determined based on dequeuing information and the queue head pointer of the linked list of the first entity queue. Based on the descriptions in the foregoing embodiments, corresponding queue information is generated for each macrocell in the first entity queue. Similarly, the corresponding queue information is also generated for the second macrocell, then the head pointer in the second macrocell may be obtained based on the queue information corresponding to the second macrocell, the second packet is read in the second macrocell based on the head pointer in the second macrocell, and the offset value corresponding to the head pointer in the second macrocell is changed. For example, the offset value of the head pointer in the second macrocell is increased by 1. This is merely an example and is not intended to limit the present invention.

It should be noted that in an implementation scenario of step C1 and step C2 in the present invention, an example in which the queue head in the first entity queue is the second macrocell is used to describe a packet dequeuing manner. If the first entity queue includes only the first macrocell, the first macrocell is the queue head as well as the queue tail in the first entity queue, so that a processing object in step C1 and step C2 may be converted into the first macrocell, to be specific, when a packet needs to be dequeued from the first macrocell, the following steps may be performed: determining, in the first entity queue, that a macrocell from which the packet needs to be dequeued is the first macrocell, where the queue information corresponding to the first macrocell includes the macrocell identifier of the first macrocell in the first entity queue, the head pointer in the first macrocell, the tail pointer in the first macrocell, and the current average packet length in the first macrocell; and reading, based on the head pointer in the first macrocell, a second packet that needs to be dequeued, and changing an offset value corresponding to the head pointer in the first macrocell.

In some embodiments of the present invention, in the implementation scenario of performing step C1 and step C2, after step C2 of reading, based on the head pointer in the second macrocell, a second packet that needs to be dequeued is performed, the queue management method provided in this embodiment of the present invention may further include the following step:

C3. Send the current average packet length in the second macrocell to a scheduler and a rate limiter, so that the scheduler updates a weight of the scheduler based on the current average packet length in the second macrocell, and the rate limiter updates a token of the rate limiter based on the current average packet length in the second macrocell.

When the second packet is dequeued, the average packet length in the second macrocell in which the second packet is located may further be provided to various levels of schedulers and rate limiters. The scheduler updates the weight of the scheduler based on the average packet length in the second macrocell, and the rate limiter updates the token of the rate limiter based on the average packet length in the second macrocell. In this method, an actual length of each packet in the second macrocell does not need to be stored, and only the average packet length needs to be maintained, so that the scheduler and the rate limiter can be updated by using the macrocell as a granularity. A scheduling effect is not affected.

In some embodiments of the present invention, after step 103 of generating, based on the first macrocell and the first entity queue, queue information corresponding to the first macrocell is performed, the queue management method provided in this embodiment of the present invention may further include the following step:

D1. Maintain the linked list of the first entity queue based on the queue information corresponding to the first macrocell.

In this embodiment of the present invention, the first entity queue may be managed by using the linked list. The linked list is a most common queue implementation, and a data structure of the linked list includes the queue head pointer and the queue tail pointer. After the first packet is written to the first macrocell enqueued to the first entity queue, the linked list of the first entity queue may be maintained based on the generated queue information corresponding to the first macrocell. Specifically, if the first entity queue before the first macrocell is enqueued is an empty queue, after the first macrocell is enqueued to the first entity queue, the queue head pointer and the queue tail pointer of the linked list of the first entity queue may point to the first macrocell; or if the first entity queue already stores another macrocell before the first macrocell is enqueued, after the first macrocell is enqueued to the first entity queue, the queue tail pointer of the linked list of the first entity queue may point to the first macrocell.

It can be learned based on the descriptions of the present invention in the foregoing embodiment that, first, the first packet is stored to the first buffer cell in the first macrocell, and the first macrocell includes the N consecutive buffer cells. Then, the average packet length in the first macrocell before the first packet is stored is corrected based on the packet length of the first packet, to obtain the current average packet length in the first macrocell. Finally, the queue information corresponding to the first macrocell is generated based on the first macrocell and the first entity queue. The queue information corresponding to the first macrocell includes the macrocell identifier of the first macrocell in the first entity queue, the head pointer in the first macrocell, the tail pointer in the first macrocell, and the current average packet length in the first macrocell. In this embodiment of the present invention, a plurality of consecutive buffer cells may be packaged into a macrocell, and the macrocell may be enqueued to an entity queue. For example, the first macrocell is enqueued to the first entity queue. Entity queue management is using a resource of a buffer cell by using a macrocell as a granularity without needing to store a pointer of a next packet to which each packet points. In this embodiment of the present invention, for a macrocell, only an average packet length in the macrocell needs to be maintained, and a packet length of each packet does not need to be stored. Therefore, in this embodiment of the present invention, when scales of packets that are buffered outside a network chip are the same, storage resources in the network chip that are occupied by the entity queue in the network chip are reduced, thereby reducing costs and power consumption of the network chip.

Figure 2:
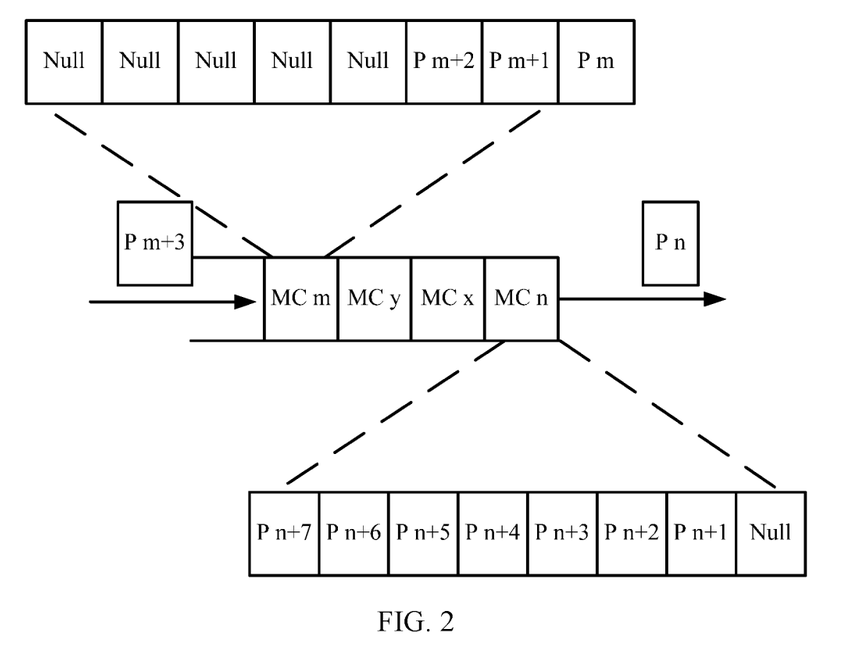
FIG. 2 is a schematic processing flowchart of a macrocell in a random memory according to an embodiment of the present invention.

To better understand and implement the foregoing solutions of the embodiments of the present invention, a corresponding application scenario is used as an example below for detailed description. Referring to FIG. 2, FIG. 2 is a schematic processing flowchart of a macrocell in a random memory according to an embodiment of the present invention. In the queue management method provided in this embodiment of the present invention, buffered packet management can be implemented by using a macrocell as a granularity. Compared with the method in the prior art, use of buffered resources in the network chip can be significantly reduced. For ease of understanding and description, it is assumed that in this embodiment of the present invention, each divided buffer cell of a DDR SDRAM outside the chip can buffer an entire packet, the buffer cell of the DDR SDRAM outside the chip is referred to as a cell, each cell has an identifier of the cell, and the identifier of the cell may correspond to a physical address of the DDR. In this embodiment of the present invention, eight cells whose addresses are consecutive form a macrocell, and an identifier of the macro cell is generated. For example, an identifier of a macro cell including eight cells whose identifiers are 0 to 7 is 0, an identifier of a macro cell including eight cells whose identifiers are 8 to 15 is 1, and the rest can be deduced by analogy. Each entity queue occupies a resource of the cell by using a macro cell as a granularity, and a linked list of the queue is also created based on the identifier of the macro cell. After the macro cell is allocated to an entity queue, a limitation is imposed. To be specific, although not all the eight cells included in the macro cell are currently occupied, an idle cell of the eight cells cannot be allocated to another entity queue, to be specific, a unique correspondence between the macrocell and the entity queue needs to be established, to ensure that queue information of all packets stored in one macrocell corresponds to a same entity queue.

As shown in FIG. 2, buffering of the random memory is managed by using a macrocell structure. Each macrocell manages a maximum of eight packets (the quantity of packets may be another value and is not limited to 8, and 8 is used as an example below for description). In FIG. 2, macrocells included in the random memory outside the network chip are respectively an MC n, an MC x, an MC y, and an MC m. The MC n includes eight consecutive buffer cells, and packets respectively stored in the eight buffer cells are P n, P n+1, P n+2, P n+3, P n+4, P n+5, P n+6, and P n+7. In the macrocell MC n, a packet that needs to be dequeued is the packet P n to which a head pointer in the MC n points. The macrocell MC m includes eight consecutive buffer cells, packets respectively stored in former three buffer cells in the macrocell MC m are P m, P m+1, and P m+2, the other buffer cells in the macrocell MC m are null (English name: Null), and in the macrocell MC m, a new packet that needs to be buffered is P m+3. The following queue information is maintained by using each macrocell as a unit. The queue information includes an identifier (namely, a next pointer) of a next macrocell to which the macrocell points, a head pointer in the macrocell, and a tail pointer in the macrocell. In addition, the queue information may further include an average packet length of all packets included in the macrocell. A queue linked list of an entire entity queue may be formed by maintaining the identifier of the next macrocell to which the macrocell points, an offset value of the head pointer in the macrocell, and an offset value of the tail pointer in the macrocell without needing to store a pointer of a next packet of each packet.

Quantity of packets in a macrocell=offset value of a tail pointer in the macrocell−offset value of a head pointer in the macrocell+1. Using the macrocell MC n as an example, offset value of the tail pointer in the macrocell−offset value of the head pointer in the macrocell=7−0, and then a result is increased by 1, so that it may be obtained that the macrocell MC n stores eight packets.

When a packet in the macrocell is dequeued, the packet to which the head pointer in the macrocell points is read. The packet is output, and the offset value of the head pointer in the macrocell is increased by 1. For example, if the packet P n to which the head pointer in the macrocell MC n points is dequeued, the offset value of the head pointer in the macrocell is increased by 1.

When an enqueued packet applies for an address from the macrocell, the tail pointer in the macrocell allocates the address to the enqueued packet, and the offset value of the tail pointer in the macrocell is increased by 1. For example, if the tail pointer in the macrocell MC m points to the packet P m+2, when the packet P m+3 is enqueued, the offset value of the tail pointer in the macrocell is increased by 1.

It should be noted that in this embodiment of the present invention, when all the packets in the macrocell are dequeued, address pointers in the macrocell may be retrieved, and the macrocell may be allocated to another entity queue. Assuming that a total quantity of buffered packets is M, and each macrocell buffers eight packets, M/8 macrocells need to be managed. The macrocell provides a length of a dequeued packet for each scheduling by using a maintained average packet length, and when a packet is dequeued, the average packet length is provided to various levels of schedulers and rate limiters. When a packet is dequeued, the average packet length in the macrocell remains unchanged. When a packet is enqueued to the macrocell, a formula for maintaining an average packet length in the macrocell is as follows: Average packet length new=(average packet length old*quantity of packets old+ enqueued packet length)/(quantity of packets old+1). In this method, an actual length of each packet in the macrocell does not need to be stored, and only the average packet length needs to be maintained. In this embodiment of the present invention, analysis may be performed by using a macrocell as a granularity. A scheduling effect is not affected.

It can be learned based on the foregoing descriptions of examples of the present invention that, in this embodiment of the present invention, the buffered resources are managed by using the macrocell, and a linked list resource of the entity queue is maintained by using a macrocell address and the head/tail offset pointer of the packet in the macrocell, thereby significantly reducing occupation by the linked list of the entity queue on resources in the chip. The average packet length of all the packets in the macrocell is maintained by using a macrocell as a unit, and statuses of the scheduler and the rate limiter are updated by using the average packet length. Compared with a conventional method in which the packet length is maintained by using a packet as a unit, occupation by scheduling information on resources in the chip is reduced, and a scheduling effect is not affected.

For a chip having a capability of processing 100 G bytes, a quantity of short packets that need to be buffered usually reaches a magnitude of hundreds of K packets, and even a magnitude of 1 M packets. An example in which 1 M packets are buffered is used as an example, each packet needs to be represented by using a 20-bit pointer. For length information of each packet, 14 bits are required when calculation is performed by using a maximum packet length supporting 9600 bytes. In the prior art, 34 Mbits are required for storing related resources of a pointer of a next packet and the packet length in the chip. The quantity of packets occupies a very large quantity of buffered resources in the chip, causing increases of costs and power consumption of the chip. However, in this embodiment of the present invention, a system manages 1 M buffer addresses, every eight consecutive buffer addresses are packaged into one macrocell, so that 128 K macrocells in total are generated. Approximately 5-Mbit buffered resources in a chip are required through calculation by using a pointer of 17 bits that is for maintaining a next macrocell and that is in each macrocell, a head/tail pointer each of 3 bits of a packet in the macrocell, and an average packet length of 14 bits in the macrocell. The 5-Mbit buffered resources are far fewer than the 34-Mbit buffered resources in the prior art. Assuming that a quantity of buffered packets is M, and a capacity of a macrocell is 8, when buffer scales of a DDR outside the chip are the same, compared with the prior art, in this embodiment of the present invention, (34−5)/34=85.29% buffered resources used by logic in the chip can be saved. Therefore, when the buffer scales outside the chip are the same, the resources in the chip that are occupied by a linked list of an entity queue and a packet length in the chip are reduced.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

To better implement the foregoing solutions of the embodiments of the present invention, the following further provides related apparatuses for implementing the foregoing solutions.

Referring to FIG. 3-a, an embodiment of the present invention provides a queue management apparatus 300. The queue management apparatus 300 may include a storage module 301, an average packet length correction module 302, and a queue information generation module 303.

Figure 3A:
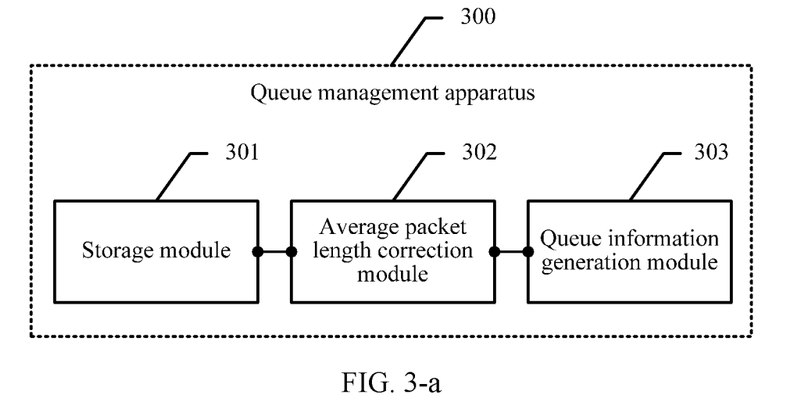

The storage module 301 is configured to store a first packet to a first buffer cell included in a first macrocell. The first macrocell is enqueued to a first entity queue, the first macrocell includes N consecutive buffer cells, N is a natural number greater than or equal to 2, and the first buffer cell belongs to the N buffer cells.

The average packet length correction module 302 is configured to correct, based on a packet length of the first packet, an average packet length in the first macrocell that is obtained before the first packet is stored, to obtain a current average packet length in the first macrocell.

The queue information generation module 303 is configured to generate, based on the first macrocell and the first entity queue, queue information corresponding to the first macrocell. The queue information corresponding to the first macrocell includes a macrocell identifier of the first macrocell in the first entity queue, a head pointer in the first macrocell, a tail pointer in the first macrocell, and the current average packet length in the first macrocell.

Figure 3B:
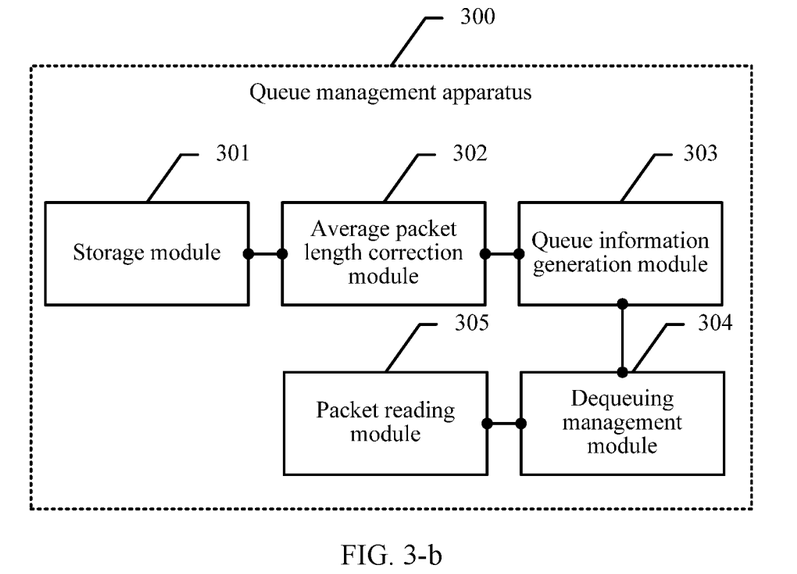

In some embodiments of the present invention, the first entity queue includes at least the first macrocell and a second macrocell that is in the first entity queue and that is located before and neighboring to the first macrocell. As shown in FIG. 3-b, the queue management apparatus 300 further includes a dequeuing management module 304 and a packet reading module 305.

The dequeuing management module 304 is configured to determine, in the first entity queue, that a macrocell from which a packet needs to be dequeued is the second macrocell. Queue information corresponding to the second macrocell includes a macrocell identifier of the second macrocell in the first entity queue, a head pointer in the second macrocell, a tail pointer in the second macrocell, and a current average packet length in the second macrocell.

The packet reading module 305 is configured to: read, based on the head pointer in the second macrocell, a second packet that needs to be dequeued, and change an offset value corresponding to the head pointer in the second macrocell.

Further, in some embodiments of the present invention, the dequeuing management module 304 is specifically configured to determine, based on a queue head pointer in a linked list of the first entity queue, that a macrocell to which the queue head pointer points is the second macrocell.

Further, in some embodiments of the present invention, as shown in FIG. 3-*c*, compared with FIG. 3-*b*, the queue management apparatus 300 further includes a sending module 306.

Figure 3C:
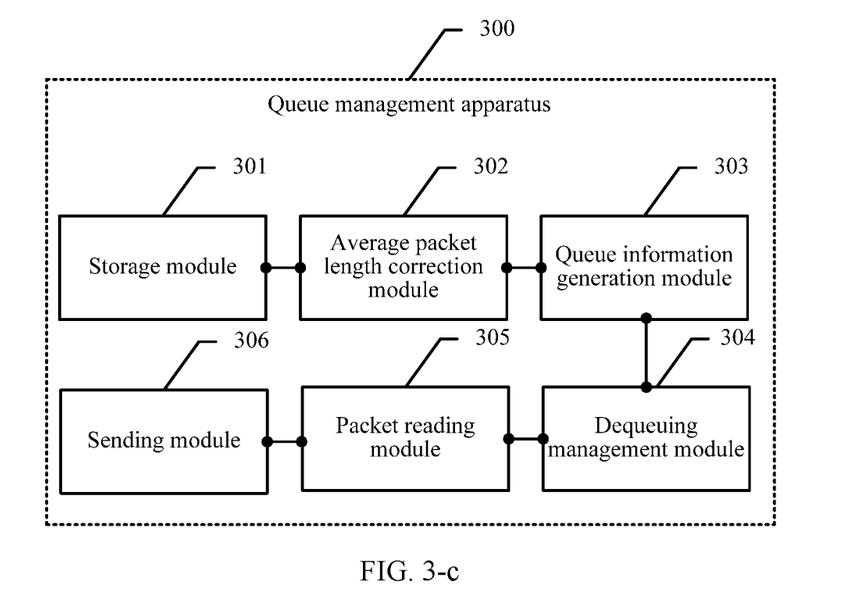

The sending module 306 is configured to: after the packet reading module 305 reads, based on the head pointer in the second macrocell, the second packet that needs to be dequeued, send the current average packet length in the second macrocell to a scheduler and a rate limiter, so that the scheduler updates a weight of the scheduler based on the current average packet length in the second macrocell, and the rate limiter updates a token of the rate limiter based on the current average packet length in the second macrocell.

In some embodiments of the present invention, as shown in FIG. 3-*d*, compared with FIG. 3-*a*, the queue management apparatus 300 further includes a linked list maintenance module 307.

Figure 3D:
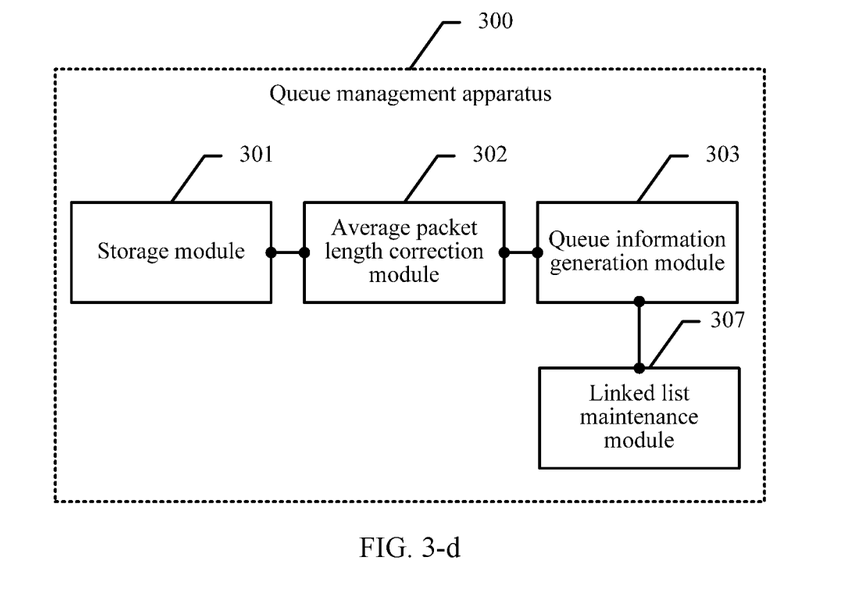

The linked list maintenance module 307 is configured to: after the queue information generation module 303 generates, based on the first macrocell and the first entity queue, the queue information corresponding to the first macrocell, maintain a linked list of the first entity queue based on the queue information corresponding to the first macrocell.

In some embodiments of the present invention, the storage module 301 is specifically configured to: allocate the tail pointer in the first macrocell to the first packet, and change an offset value corresponding to the tail pointer in the first macrocell.

Figure 3E:
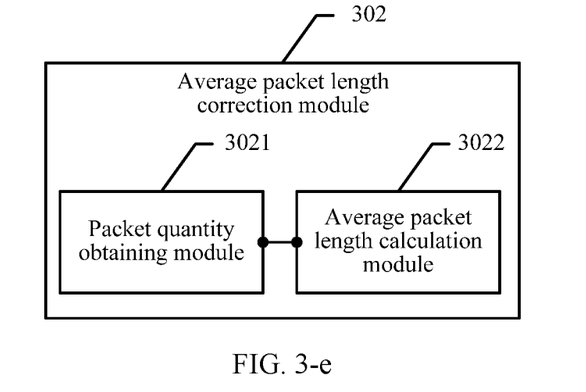

In some embodiments of the present invention, as shown in FIG. 3-*e*, the average packet length correction module 302 includes:

a packet quantity obtaining module 3021, configured to obtain a quantity of all packets that are already stored in the first macrocell before the first packet is stored; and an average packet length calculation module 3022, configured to calculate and correct the current average packet length in the first macrocell based on the quantity of all packets that are already stored, the average packet length in the first macrocell before the first packet is stored, and the packet length of the first packet.

It can be learned based on the descriptions of the present invention in the foregoing embodiment that, first, the first packet is stored to the first buffer cell in the first macrocell, and the first macrocell includes the N consecutive buffer cells. Then, the average packet length in the first macrocell before the first packet is stored is corrected based on the packet length of the first packet, to obtain the current average packet length in the first macrocell. Finally, the queue information corresponding to the first macrocell is generated based on the first macrocell and the first entity queue. The queue information corresponding to the first macrocell includes the macrocell identifier of the first macrocell in the first entity queue, the head pointer in the first macrocell, the tail pointer in the first macrocell, and the current average packet length in the first macrocell. In this embodiment of the present invention, a plurality of consecutive buffer cells may be packaged into a macrocell, and the macrocell may be enqueued to an entity queue. For example, the first macrocell is enqueued to the first entity queue. Entity queue management is using a resource of a buffer cell by using a macrocell as a granularity without needing to store a pointer of a next packet to which each packet points. In this embodiment of the present invention, for a macrocell, only an average packet length in the macrocell needs to be maintained, and a packet length of each packet does not need to be stored. Therefore, in this embodiment of the present invention, when scales of packets that are buffered outside a network chip are the same, storage resources in the network chip that are occupied by the entity queue in the network chip are reduced, thereby reducing costs and power consumption of the network chip.

It should be noted that content such as information exchange between the modules/units of the apparatus and execution processes thereof is based on a same idea as the method embodiments of the present invention, and brings same technical effects as the method embodiments of the present invention. For detailed content, refer to the foregoing descriptions in the method embodiments of the present invention, and details are not described herein again.

An embodiment of the present invention further provides a computer storage medium. The computer storage medium stores a program, and the program performs some or all of the steps set forth in the foregoing method embodiments.

Figure 4:
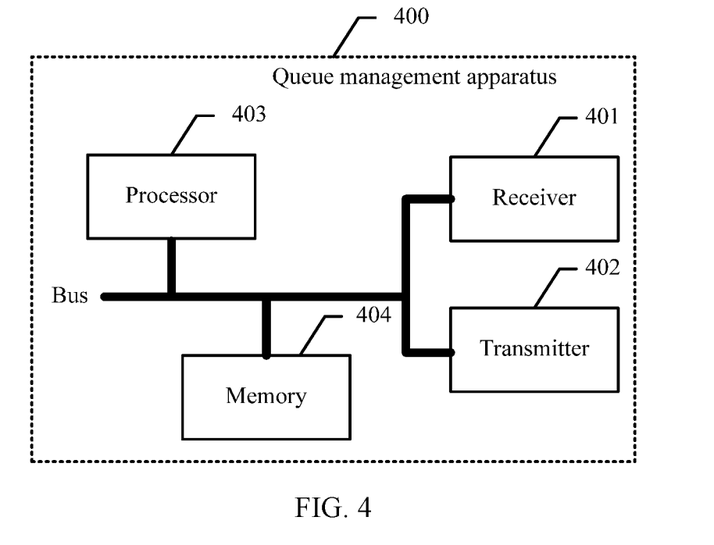
FIG. 4 is a schematic structural composition diagram of another queue management apparatus according to an embodiment of the present invention.

Another queue management apparatus provided in an embodiment of the present invention is described below. Referring to FIG. 4, the queue management apparatus 400 includes:

a receiver 401, a transmitter 402, a processor 403, and a memory 404 (there may be one or more processors 403 in the queue management apparatus 400, and in FIG. 4, one processor is used as an example). In some embodiments of the present invention, the receiver 401, the transmitter 402, the processor 403, and the memory 404 may be connected by using a bus or in another manner. In FIG. 4, an example in which the transmitter 402, the processor 403, and the memory 404 are connected by using a bus is used.

The memory 404 may include a read-only memory and a random access memory, and provide an instruction and data to the processor 403. A part of the memory 404 may further include a non-volatile random access memory (English full name: Non-Volatile Random Access Memory, NVRAM for short). The memory 404 stores an operating system and an operation instruction, an executable module, or a data structure, or a subset thereof, or an extended set thereof. The operation instruction may include various operation instructions used to implement various operations. The operating system may include various system programs used to implement various basic services and process a hardware-based task.

The processor 403 controls an operation of the queue management apparatus. The processor 403 may also be referred to as a central processing unit (English full name: Central Processing Unit, CPU for short). In a specific application, all the components of the queue management apparatus are coupled together by using a bus system. In addition to a data bus, the bus system may further include a power bus, a control bus, a status signal bus and the like. However, for clear description, various types of buses in the figure are marked as the bus system.

The methods disclosed in the foregoing embodiments of the present invention may be applied to the processor 403 or may be implemented by the processor 403. The processor 403 may be an integrated circuit chip and has a signal processing capability. In an implementation process, the steps in the foregoing methods may be implemented by using a hardware integrated logic circuit in the processor 403 or by using an instruction in a form of software. The processor 403 may be a general purpose processor, a digital signal processor (DSP for short), an application-specific integrated circuit (ASIC for short), a field-programmable gate array (FPGA for short) or another programmable logical device, a discrete gate, a transistor logic device, or a discrete hardware component. The processor 403 may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly implemented by using a hardware decoding processor, or may be implemented by using a combination of hardware and software modules in the decoding processor. The software module may be located in a mature storage medium in the art, for example, a random access memory, a flash memory, a read-only memory, a programmable read-only memory, an electrically erasable programmable memory, and a register. The storage medium is located in the memory 404, and the processor 403 reads information in the memory 404 and implements the steps in the foregoing methods in combination with hardware of the processor.

In this embodiment of the present invention, the processor 403 is configured to perform the queue management method described in the foregoing embodiments. For details, refer to the descriptions in the foregoing embodiment.

In this embodiment of the present invention, the memory 404 stores a first entity queue, and a first macrocell is enqueued to the first entity queue. The first macrocell includes N consecutive buffer cells, N is a natural number greater than or equal to 2, and a first buffer cell belongs to the N buffer cells.

In this embodiment of the present invention, the processor 403 is configured to perform the following steps:

storing a first packet to the first buffer cell included in the first macrocell, where the first macrocell is enqueued to the first entity queue, the first macrocell includes the N consecutive buffer cells, N is a natural number greater than or equal to 2, and the first buffer cell belongs to the N buffer cells;

correcting, based on a packet length of the first packet, an average packet length in the first macrocell that is obtained before the first packet is stored, to obtain a current average packet length in the first macrocell; and generating, based on the first macrocell and the first entity queue, queue information corresponding to the first macrocell, where the queue information corresponding to the first macrocell includes a macrocell identifier of the first macrocell in the first entity queue, a head pointer in the first macrocell, a tail pointer in the first macrocell, and the current average packet length in the first macrocell.

In this embodiment of the present invention, the first entity queue includes at least the first macrocell and a second macrocell that is in the first entity queue and that is located before and neighboring to the first macrocell, and the processor 403 is further configured to perform the following steps:

determining, in the first entity queue, that a macrocell from which a packet needs to be dequeued is the second macrocell, where queue information corresponding to the second macrocell includes a macrocell identifier of the second macrocell in the first entity queue, a head pointer in the second macrocell, a tail pointer in the second macrocell, and a current average packet length in the second macrocell; and reading, based on the head pointer in the second macrocell, a second packet that needs to be dequeued, and changing an offset value corresponding to the head pointer in the second macrocell.

In some embodiments of the present invention, the processor 403 is further configured to perform the following step: after the reading, based on the head pointer in the second macrocell, a second packet that needs to be dequeued, sending the current average packet length in the second macrocell to a scheduler and a rate limiter, so that the scheduler updates a weight of the scheduler based on the current average packet length in the second macrocell, and the rate limiter updates a token of the rate limiter based on the current average packet length in the second macrocell.

In some embodiments of the present invention, the processor 403 is further configured to perform the following step: after the generating, based on the first macrocell and the first entity queue, queue information corresponding to the first macrocell, maintaining a linked list of the first entity queue based on the queue information corresponding to the first macrocell.

In some embodiments of the present invention, the processor 403 is specifically configured to perform the following step:

allocating the tail pointer in the first macrocell to the first packet, and changing an offset value corresponding to the tail pointer in the first macrocell.

In some embodiments of the present invention, the processor 403 is specifically configured to perform the following steps:

obtaining a quantity of all packets that are already stored in the first macrocell before the first packet is stored; and calculating the current average packet length in the first macrocell based on the quantity of all packets that are already stored, the average packet length in the first macrocell before the first packet is stored, and the packet length of the first packet.

It can be learned based on the descriptions of the present invention in the foregoing embodiment that, first, the first packet is stored to the first buffer cell in the first macrocell, and the first macrocell includes the N consecutive buffer cells. Then, the average packet length in the first macrocell before the first packet is stored is corrected based on the packet length of the first packet, to obtain the current average packet length in the first macrocell. Finally, the first macrocell is enqueued to the first entity queue, and the queue information corresponding to the first macrocell is generated based on the first macrocell and the first entity queue. The queue information corresponding to the first macrocell includes the macrocell identifier of the first macrocell in the first entity queue, the head pointer in the first macrocell, the tail pointer in the first macrocell, and the current average packet length in the first macrocell. In this embodiment of the present invention, a plurality of consecutive buffer cells may be packaged into a macrocell, and the macrocell is enqueued to an entity queue. For example, the first macrocell is enqueued to the first entity queue. Entity queue management is using a resource of a buffer cell by using a macrocell as a granularity without needing to store a pointer of a next packet to which each packet points. In this embodiment of the present invention, for a macrocell, only an average packet length in the macrocell needs to be maintained, and a packet length of each packet does not need to be stored. Therefore, in this embodiment of the present invention, when scales of packets that are buffered outside a network chip are the same, storage resources in the network chip that are occupied by the entity queue in the network chip are reduced, thereby reducing costs and power consumption of the network chip.

In addition, it should be noted that the foregoing described apparatus embodiment is merely an example. The units described as separate parts may or may not be physically separate, and parts displayed as units may or may not be physical units, may be located in one position, or may be distributed on a plurality of network units. Some or all of the modules may be selected based on actual needs to achieve the objectives of the solutions of the embodiments. In addition, in the accompanying drawings of the apparatus embodiments provided in the present invention, connection relationships between modules indicate that the modules have communication connections with each other, and the communication connections may be specifically implemented as one or more communications buses or signal cables. Persons of ordinary skill in the art may understand and implement the embodiments of the present invention without creative efforts.

Based on the descriptions of the foregoing implementations, persons skilled in the art may clearly understand that the present invention may be implemented by using software in addition to necessary universal hardware, or by using dedicated hardware, including a dedicated integrated circuit, a dedicated CPU, a dedicated memory, a dedicated component, and the like. Usually, any function that is implemented by using a computer program can be easily implemented by using corresponding hardware. Moreover, a specific hardware structure used to achieve a same function may be of various forms, for example, in a form of an analog circuit, a digital circuit, or a dedicated circuit. However, implementing the present invention by using a software program is a preferred implementation in most cases. Based on such an understanding, the technical solutions of the present invention essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

In conclusion, the foregoing embodiments are merely intended for describing the technical solutions of the present invention rather than for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from scope of the technical solutions of the embodiments of the present invention.

What is claimed is:

1. A queue management method, comprising:
storing a first packet to a first buffer cell of a first macrocell comprising N consecutive buffer cells, wherein the first macrocell is enqueued to a first entity queue comprising the first macrocell and a second macrocell, wherein N is a natural number greater than or equal to 2, and wherein the first buffer cell belongs to the N consecutive buffer cells;
correcting, based on a first packet length of the first packet, a first average packet length in the first macrocell before storing the first packet to obtain a first current average packet length in the first macrocell;
generating, based on the first macrocell and the first entity queue, first queue information corresponding to the first macrocell, wherein the first queue information comprises a first macrocell identifier of the first macrocell in the first entity queue, a first head pointer in the first macrocell, a first tail pointer in the first macrocell, and the first current average packet length;
determining, in the first entity queue, a macrocell where a packet is to be dequeued as the second macrocell, wherein second queue information corresponding to the second macrocell comprises a second head pointer in the second macrocell and a second current average packet length in the second macrocell;
reading, based on the second head pointer, a second packet that is to be dequeued in the second macrocell;
sending, to a scheduler, the second current average packet length after reading the second packet that is to be dequeued to enable the scheduler to update a weight of the scheduler based on the second current average packet length; and
sending, to a rate limiter, the second current average packet length after reading the second packet that is to be dequeued to enable the rate limiter to update a token of the rate limiter based on the second current average packet length.

2. The queue management method of claim 1, wherein the second macrocell is located before and neighboring to the first macrocell, wherein the second queue information further comprises a second macrocell identifier of the second macrocell in the first entity queue, and a second tail pointer in the second macrocell, and wherein the queue management method further comprises:
changing an offset value corresponding to the second head pointer in response to reading the second packet that is to be dequeued.

3. The queue management method of claim 1, wherein after generating, based on the first macrocell and the first entity queue, the first queue information, the queue management method further comprises maintaining a linked list of the first entity queue based on the first queue information.

4. The queue management method of claim 1, wherein storing the first packet to the first buffer cell of the first macrocell comprises:
allocating the first tail pointer to the first packet; and
changing an offset value corresponding to the first tail pointer in response to allocating the first tail pointer to the first packet.

5. The queue management method of claim 1, wherein correcting the first average packet length in the first macrocell before storing the first packet comprises:
obtaining a quantity of all packets that are stored in the first macrocell before storing the first packet; and
calculating the first current average packet length based on the quantity of packets that are stored in the first macrocell, the first average packet length before storing the first packet and the first packet length.

6. A queue management apparatus, comprising:
a memory configured to store instructions; and
a processor coupled to the memory and configured to execute the instructions that cause the queue management apparatus to:
store a first packet to a first buffer cell in a first macrocell comprising N consecutive buffer cells, wherein the first macrocell is enqueued to a first entity queue comprising the first macrocell and a second macrocell, wherein N is a natural number greater than or equal to 2, and wherein the first buffer cell belongs to the N consecutive buffer cells;
correct, based on a first packet length of the first packet, a first average packet length in the first macrocell before storing the first packet to obtain a first current average packet length in the first macrocell;
generate, based on the first macrocell and the first entity queue, first queue information corresponding to the first macrocell, wherein the first queue information comprises a first macrocell identifier of the first macrocell in the first entity queue, a first head pointer in the first macrocell, a first tail pointer in the first macrocell, and the first current average packet length;
determine, in the first entity queue, a macrocell where a packet is to be dequeued as the second macrocell, wherein second queue information corresponding to the second macrocell comprises a second head pointer in the second macrocell and a second current average packet length in the second macrocell;
read, based on the second head pointer, a second packet that is to be dequeued in the second macrocell;
send, to a scheduler, the second current average packet length after reading the second packet that is to be dequeued to enable the scheduler to update a weight of the scheduler based on the second current average packet length; and
send, to a rate limiter, the second current average packet length after reading the second packet that is to be dequeued to enable the rate limiter to update a token of the rate limiter based on the second current average packet length.

7. The queue management apparatus of claim 6, wherein the second macrocell is located before and neighboring to the first macrocell,
wherein the second queue information further comprises a second macrocell identifier of the second macrocell in the first entity queue, and a second tail pointer in the second macrocell, and wherein the instructions further cause the queue management apparatus to change an offset value corresponding to the second head pointer in response to reading the second packet that is to be dequeued.

8. The queue management apparatus of claim 6, wherein the instructions further cause the queue management apparatus to maintain a linked list of the first entity queue based on the first queue information after generating the first queue information.

9. The queue management apparatus of claim 6, wherein the instructions further cause the queue management apparatus to:
allocate the first tail pointer to the first packet; and
change an offset value corresponding to the first tail pointer in response to allocating the first tail pointer to the first packet.

10. The queue management apparatus of claim 6, wherein the instructions further cause the queue management apparatus to:
obtain a quantity of packets that are stored in the first macrocell before storing the first packet; and
calculate and correct the first average packet length based on the quantity of packets that are stored in the first macrocell, the first average packet length before storing the first packet, and the first packet length.

11. The queue management method of claim 3, further comprising determining, based on a queue head pointer in the linked list, a macrocell where the queue head pointer points is the second macrocell.

12. The queue management apparatus of claim 8, wherein the linked list comprises a queue head pointer, and wherein the instructions further cause the queue management apparatus to determine, based on the queue head pointer, a macrocell where the queue head pointer points is the second macrocell.

13. A non-transitory computer-readable medium comprising computer-executable instructions that, when executed by a processor, cause a queue management apparatus to:
store a first packet to a first buffer cell in a first macrocell comprising N consecutive buffer cells, wherein the first macrocell is enqueued to a first entity queue comprising the first macrocell and a second macrocell, wherein N is a natural number greater than or equal to 2, and wherein the first buffer cell belongs to the N consecutive buffer cells;
correct, based on a first packet length of the first packet, a first average packet length in the first macrocell before storing the first packet to obtain a first current average packet length in the first macrocell;
generate, based on the first macrocell and the first entity queue, first queue information corresponding to the first macrocell, wherein the first queue information comprises a first macrocell identifier of the first macrocell in the first entity queue, a first head pointer in the first macrocell, a first tail pointer in the first macrocell, and the first current average packet length;
determine, in the first entity queue, a macrocell where a packet is to be dequeued as the second macrocell, wherein second queue information corresponding to the second macrocell comprises a second head pointer in the second macrocell and a second current average packet length in the second macrocell;
read, based on the second head pointer, a second packet that is to be dequeued in the second macrocell;
send, to a scheduler, the second current average packet length after reading the second packet that is to be dequeued to enable the scheduler to update a weight of the scheduler based on the second current average packet length; and
send, to a rate limiter, the second current average packet length after reading the second packet that is to be dequeued to enable the rate limiter to update a token of the rate limiter based on the second current average packet length.

14. The non-transitory computer-readable medium of claim 13, wherein the second macrocell is located before and neighboring to the first macrocell, wherein the second queue information further comprises a second macrocell identifier of the second macrocell in the first entity queue and a second tail pointer in the second macrocell, and wherein the instructions further cause the queue management apparatus to change an offset value corresponding to the second head pointer in response to reading the second packet that is to be dequeued.

15. The non-transitory computer-readable medium of claim 13, wherein the instructions further cause the queue management apparatus to maintain a linked list of the first entity queue based on the first queue information after generating the first queue information.

16. The non-transitory computer-readable medium of claim 15, wherein the linked list comprises a queue head pointer, and wherein the instructions further cause the queue management apparatus to determine, based on the queue head pointer, a macrocell where the queue head pointer points is the second macrocell.

17. The non-transitory computer-readable medium of claim 13, wherein the instructions further cause the queue management apparatus to allocate the first tail pointer to the first packet.

18. The non-transitory computer-readable medium of claim 17, wherein the instructions further cause the queue management apparatus to change an offset value corresponding to the first tail pointer in response to allocating the first tail pointer to the first packet.

19. The non-transitory computer-readable medium of claim 13, wherein the instructions further cause the queue management apparatus to obtain a quantity of packets that are stored in the first macrocell before storing the first packet.

20. The non-transitory computer-readable medium of claim 19, wherein the instructions further cause the queue management apparatus to calculate and correct the first average packet length based on the quantity of packets that are stored in the first macrocell, the first average packet length before storing the first packet, and the first packet length.

* * * * *